United States Patent
Christie

[11] Patent Number: 5,947,410
[45] Date of Patent: *Sep. 7, 1999

[54] TAPE TENSIONING DEVICE AND A METHOD FOR TAPE TENSIONING

[75] Inventor: Nicolai W. Christie, Oslo, Norway

[73] Assignee: Tandberg Data ASA, Oslo, Norway

[ * ] Notice: This patent is subject to a terminal disclaimer.

[21] Appl. No.: 08/962,354

[22] Filed: Oct. 31, 1997

Related U.S. Application Data

[63] Continuation-in-part of application No. 08/786,571, Jan. 21, 1997, Pat. No. 5,868,350.

[51] Int. Cl.⁶ .......................... B65H 57/28; B65H 77/00; G03B 23/02
[52] U.S. Cl. .................................. 242/615.1; 242/346.1; 242/417.3; 242/419
[58] Field of Search .................. 242/615.1, 615, 242/417.3, 346.1, 615.21; 226/196.1

[56] References Cited

U.S. PATENT DOCUMENTS

| | | |
|---|---|---|
| 1,189,611 | 7/1916 | Morse ........................... 242/417.3 X |
| 2,603,721 | 7/1952 | Camras . |
| 2,686,230 | 8/1954 | Camras . |
| 2,696,192 | 12/1954 | Birchler et al. . |
| 2,864,621 | 12/1958 | Stavrakis et al. . |
| 2,873,318 | 2/1959 | Moore . |
| 3,140,033 | 7/1964 | Zivny . |
| 3,329,434 | 7/1967 | Walker . |
| 3,372,938 | 3/1968 | Hoag . |
| 3,378,266 | 4/1968 | Karecki . |
| 3,749,851 | 7/1973 | Nakamichi . |
| 3,974,952 | 8/1976 | Swanke et al. ................. 226/196.1 X |
| 3,984,049 | 10/1976 | Shawen . |
| 4,307,427 | 12/1981 | Kawachi . |
| 4,320,429 | 3/1982 | Knerich et al. . |
| 4,403,720 | 9/1983 | Grant . |
| 4,571,654 | 2/1986 | Oishi . |
| 4,638,392 | 1/1987 | Akutsu . |
| 4,663,687 | 5/1987 | Dalziel . |
| 4,739,423 | 4/1988 | Ida . |
| 4,747,007 | 5/1988 | Ikebe et al. . |
| 4,933,788 | 6/1990 | Patel et al. . |
| 5,251,844 | 10/1993 | Albrecht et al. . |
| 5,323,280 | 6/1994 | Rudi . |
| 5,417,413 | 5/1995 | Huffman et al. . |
| 5,430,586 | 7/1995 | Koo . |

*Primary Examiner*—Michael R. Mansen
*Attorney, Agent, or Firm*—Hill & Simpson

[57] ABSTRACT

A tensioning device loaded tape transversal tension control device and method are provided to equalize tape tension across a transverse cross-section of a tape to provide a more stable tension throughout the tape such that a reduction in maximum tape tension can be achieved. The device includes a central tensioning device and an outer tensioning device for rotationally balancing tape tension by pivoting the device under tensioning device force to press onto or retract from portions of the tape.

13 Claims, 5 Drawing Sheets

TAPE TENSIONING DEVICE AND A METHOD FOR TAPE TENSIONING

RELATED APPLICATION DATA

This application is a continuation-in-part application of U.S. patent application Ser. No. 08/786,571, filed on Jan. 21, 1997 now U.S. Pat. No. 5,868,350.

BACKGROUND OF THE INVENTION

The present invention generally relates to magnetic storage devices and read and write heads for tape drives. More specifically, the present invention relates to a method and an apparatus for achieving uniform head-to-tape contact at all tape track positions.

An important requirement in the field of recording on magnetic tape is that the tape is in physical contact with the head for reading and writing. This requirement is different for magnetic recording on a hard disc, for example, where there is a space between the recording medium and the head. In high density recording, proper head-to-tape contact is of extreme importance since a separation between the head and the tape on the order of magnitude of only a few nanometers creates a significant loss of signal amplitude from the head due to the so-called "distance loss." In order to achieve proper contact between the magnetic head and the tape, various methods have been used.

One attempt at maintaining sufficient head-to-tape contact has been the use of a vacuum, such that a suction at each side of the write or read head keeps the tape in a very well defined and precisely controlled contact with the head. Although this method is efficient, the apparatus is too complex to accommodate easily into smaller form factors, low profile tape drives in use today.

Another method of assuring adequate tape-to-head contact is to use a pressure pad on a side of the tape opposite to the head and press the tape into contact with the head. The disadvantage of this method is the difficulty of obtaining a uniform contact and surface pressure between the head and the tape due to irregularities in the material of the pressure pad, or the fact that dust particles may collect on the pressure pad and produce a variation of the surface pressure over the area of the pressure pad.

A third method of achieving sufficient tape-to-head contact is to tension the tape during its circulation while arranging the head to protrude into the tape path so that a force proportional to the tape tension retains the tape in contact with the magnetic head. This method is relatively simple to implement and has been a very efficient way to provide proper head-to-tape contact. The tape may be tensioned in different ways such as by mechanical friction or by electrical control of the motors that are connected to the tape hubs.

A known method for achieving precise control of the tape tension generated in different ways as previously described, such as in a professional open-reel tape recorder, is to position a spring-loaded bar or pin made of a completely non-magnetic material into the tape path. U.S. Pat. No. 4,390,909 discloses such a structure. If such a tension control device is designed properly, the force that the pin exerts on the tape is, by and large, independent of the position of the pin, and the pin is oriented such that the centered line coincides completely with a line in the plane formed of the tape surface, that is, perpendicular to the direction of movement to the magnetic tape when the tape is not in contact with the tensioning device. Thus, this tension control device will compensate random variations in the tape tension below the resonance frequency that is determined by the movable mass of the mechanical tensioning device and the spring constant. Such variations in the tape tension may, for example, be produced by random variations of the friction coefficient as the tape moves through the tape guiding mechanism.

A problem relating to the method of tensioning of tape in order to achieve proper head-to-tape contact is that the tape tension is sometimes not distributed equally over the transverse cross-section of the tape. This unequal distribution of tape tension is due to the fact that the thickness and other properties of the tape base film vary along the tape, but also because the tape is slitted with limited accuracy. Tape manufacturers continuously work to increase the quality of the base film and precision of the slitting process in the production of today's high performance computer tapes. However, variations in slitting of the tape cause the center line of the tape to deviate from a straight line when it is laid down freely on a surface, and consequently, a non-uniform tension along the cross-section of the tape is produced when the tape is tensioned and forced into a straight guiding mechanism.

A non-uniform tape tension, or a varying "transversal tension profile" of the tape may result in deficient head-to-tape contact with resulting loss in signal amplitude. Due to this factor, the tape tension must be increased to a level that generally is significantly higher than the level that would be required for a perfectly slitted tape with a completely uniform base film. However, increased tape tension is not desirable because of increased wear of the tape surface as well as the tape edges, increased wear of the magnetic head, higher generation of heat in the tape guiding mechanism, and increased power dissipation of the electrical motors or mechanical tape tensioning devices. The mechanical stress and wear of the tape edges are caused by the forces that act on the tape due to the mentioned imperfections of the slitting process and variations of the properties of the base film and these forces increase with increasing tape tension. Nevertheless, the current requirement for even higher recording densities requires a precisely controlled level of tape tension along the complete cross-section of the tape while reducing mechanical wear of the magnetic head and tape to a minimum.

SUMMARY OF THE INVENTION

It is an object of the present invention to provide a method and apparatus for accurately controlling the tape tension across a complete cross-section of the tape to achieve uniform head-to-tape contact at all track positions.

It is a further object of the present invention to obtain optimized read and write performance at very high transition densities even at low values of the total tension of the tape, and, consequently, to provide low tape wear and low head wear, as well as reduced heat generation between the tape and the stationary parts.

The objects are achieved by a tape tensioning device, also called a "transversal tape tension controller" which provides a bar that is mounted to a spring-loaded pin. The device can be positioned into the tape path in such a way that the tape forms an angle as the tape passes the tension controller. Due to the tape tension, the spring is compressed to a point where the spring force equals the force component of the tape tension that is directed against the tension controller. The tension controller is furthermore positioned in such a way that, without any load, the central line of the bar in contact with the tape surface coincides with the line in the plane formed by the tape that also is perpendicular to the direction of movement to the tape when the tension controller is not inserted into the tape path.

The tension controller can be positioned on the front side or the back side of the magnetic surface of the tape. The tension controller may also be a part of the cartridge that also contains a guiding mechanism for the tape. Alternatively, the tension controller may be part of the magnetic recording device.

The transversal tension controller may be designed with separate springs for the upper and lower parts in order to obtain an asymmetric design where needed. The spring constants may be different, or the lengths of the springs (when measured without any load) may be different. A design that includes a flexible control surface may be able to compensate for second order or higher components of the transversal tension of the tape. Thus, the invention provides a method and apparatus for accurate control of the tape tension across the complete cross-section of the tape in order to achieve uniform head-to-tape contact at all track positions to obtain optimized read and write performance at very high transition densities and even at low values of the total tension of the tape, and to consequently lower tape wear as well as lower head wear.

These and other advantages of the present invention are described in, and will be apparent from, the detailed description of the presently preferred embodiments and from the drawings.

DETAILED DESCRIPTION OF THE PRESENTLY PREFERRED EMBODIMENTS

Figure 1:
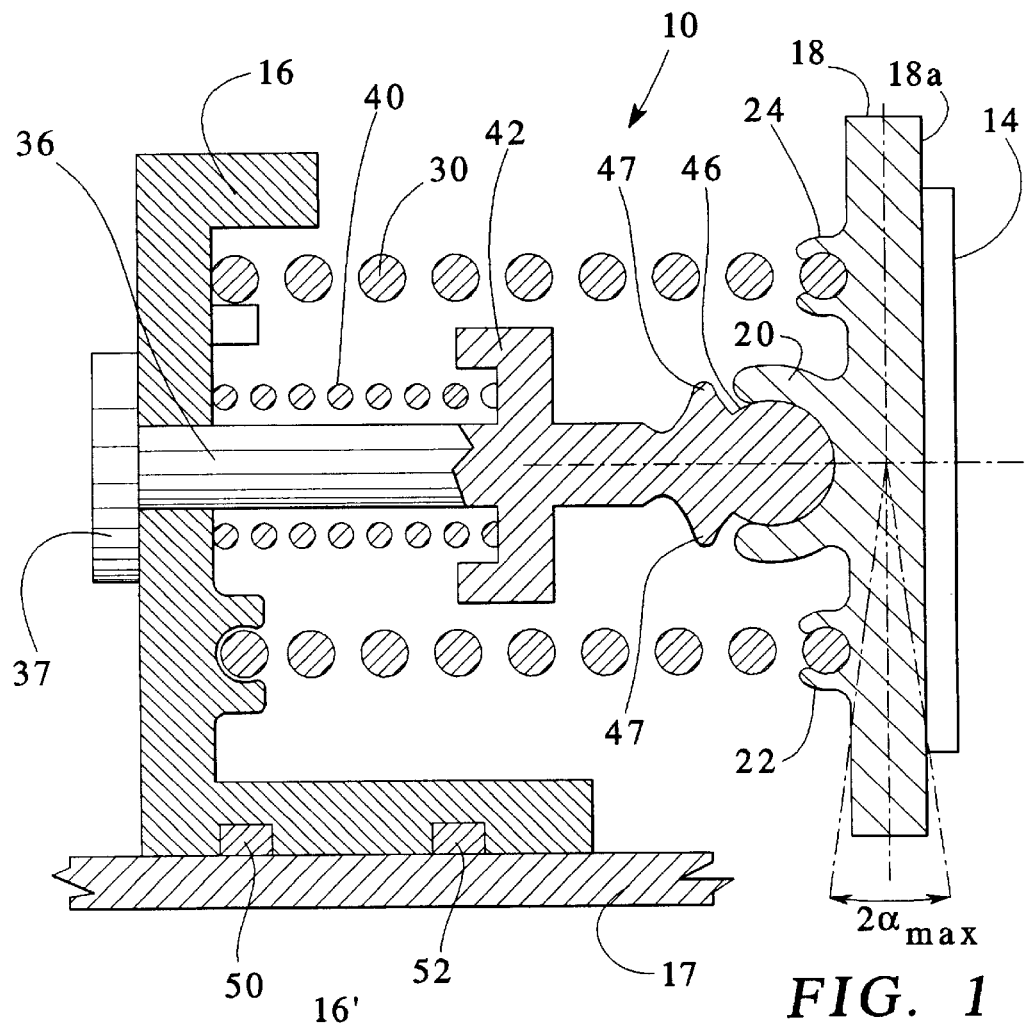
FIG. 1 illustrates a schematic longitudinal sectional view of an embodiment of a transversal tape tensioning device of the present invention.
Figure 5:
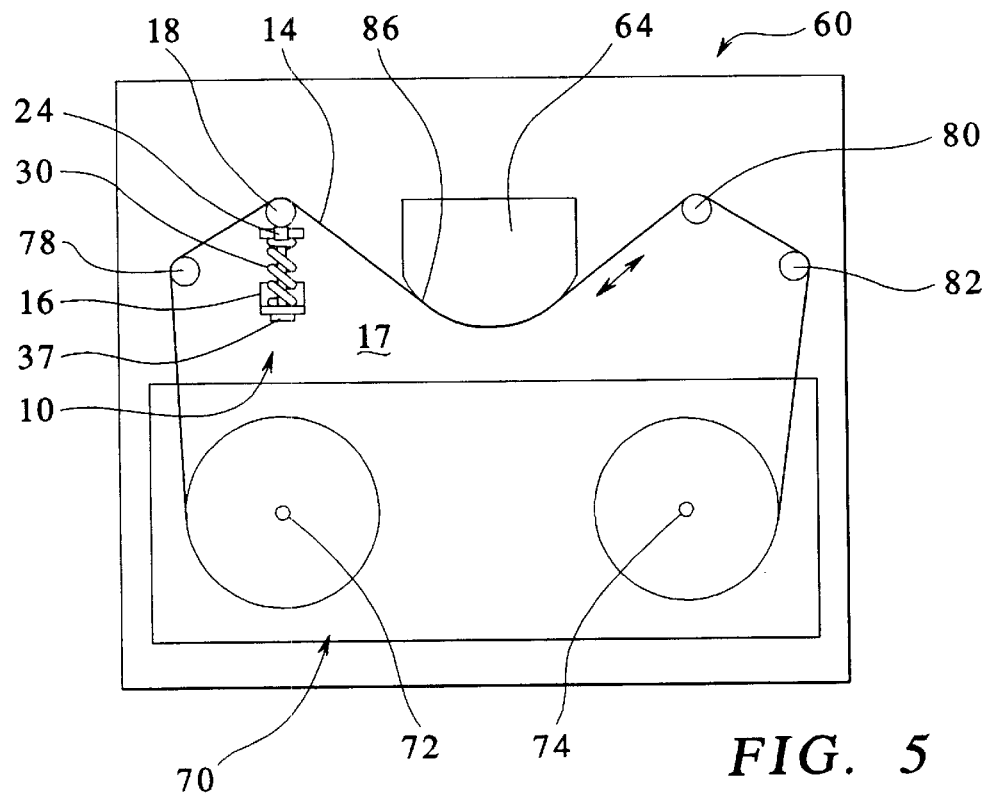
FIG. 5 illustrates a schematic plan view of an embodiment of a tensioning device applied to a tape cartridge and tape drive arrangement.

Referring now to the drawings wherein like numerals represent like parts, FIG. 1 illustrates an embodiment of an advantageous apparatus of the present invention. A tape tensioning device 10 is provided to press against a span of magnetic tape 14 to control the tape tension of the tape 14 as shown in FIG. 5. The device 10 includes a relatively stationary backstop 16 connected firmly to a floor structure 17 of a tape drive. A tension control bar 18 is provided to press against and tension the tape 14. The control bar 18 has formations on a side opposite the tape 14 including a cylindrical socket 20 and spring clips 22,24 arranged on opposite sides vertically of the cylindrical socket 20.

A coil spring 30 is grasped by the spring clips 22,24 and extends backward to the backstop 16. The spring 30 biases the control bar 18 and is sufficiently flexible to allow the control bar 18 to pivot to an angle of $\alpha_{max}$ in either direction defined by stop elements 47. The total angular movement of the bar is $2\alpha_{max}$. A pin 36 is spring-loaded away from the backstop 16 by a second coil spring 40 arranged between the backstop 16 and an annular shoulder 42 formed on the pin 36. A head portion 37 retains the pin 36 onto the backstop 16 and limits the full extent of the pin 36 away from the backstop 37. Extending further along a length of the pin 36 from the shoulder 42 is a cylindrical joint element 46 received in the cylindrical socket 20. The spring 40 biases the shoulder 42 and thus the entire pin 36 away from the backstop 16 and thus biases the control bar 18 towards the tape 14. Alternatively to the cylindrical socket 20 and the element 46, a ball socket and a ball element can be used.

The second spring 40 stabilizes the initial total tape tension, and the first spring 30 controls the transversal tape tension if the spring constant of the spring 40 is much higher than the spring constant of the spring 30. A surface 18a of the control bar 18, which is advantageously a cylindrical surface, moves according to the actual tape tension. The surface 18a may be made flexible, for example, by a layer of flexible material applied onto the bar 18 to compensate for second or higher order components of the transversal tension of the tape 14. However, second order components are probably not significant due to the geometry of the problem; that is, a relatively small tape width as compared to the total length of the tape path results in reduction in only first order components which, in most cases, is sufficient.

The high tension part of the tape 14 actively increases the tension of the other regions of the tape 14 transversely as the tension control bar pivots at the cylindrical element 46 and the socket 20 in one of the other rotary directions towards + or – $\alpha_{max}$. The backstop 16 is connected at fastener locations 50,52 to the base plate 17 of the tape drive. The fastener locations 50,52 may be bars which lock the backstop 16 to the floor 17 by adhesive.

For a case where the tape 14 moves horizontally and the tape path is formed by hypothetical perfectly aligned vertical guides and pins, from an equilibrium consideration, the control surface 18a of the tension control bar 18 that is in contact with the tape 14 will also be vertically arranged given that the tension control bar is symmetrical above the center line of the tape 14 and that the tape tension is uniform across a cross-section of the tape 14. The described equilibrium state is characterized by the angle $\alpha$ of the control bar 18 equal to zero. However, if the tape tension is higher at an upper part of the tape 14, the control surface 18a of the transversal tension controller 18 is pressed inwardly relative to the lower part of the control surface 18a leading to a non-zero angle $\alpha$. The lower part of the control surface 18a is thus pressed outwardly, and the effect of this is that the tape tension of this part of the tape 14 is increased since the distance this part of the tape 14 has to travel becomes longer (as seen in FIG. 5). The tape tension of the upper part of the tape 14 is, on the contrary, reduced since this part of the tape 14 has a shorter travel distance. As a consequence, the difference between the tape tension and the upper and lower part of the tape 14 is reduced. As a secondary effect, the force that presses the tape 14 against the guide flange in a vertical direction is reduced, and the mechanical load on the tape edge is also reduced.

Figure 2:
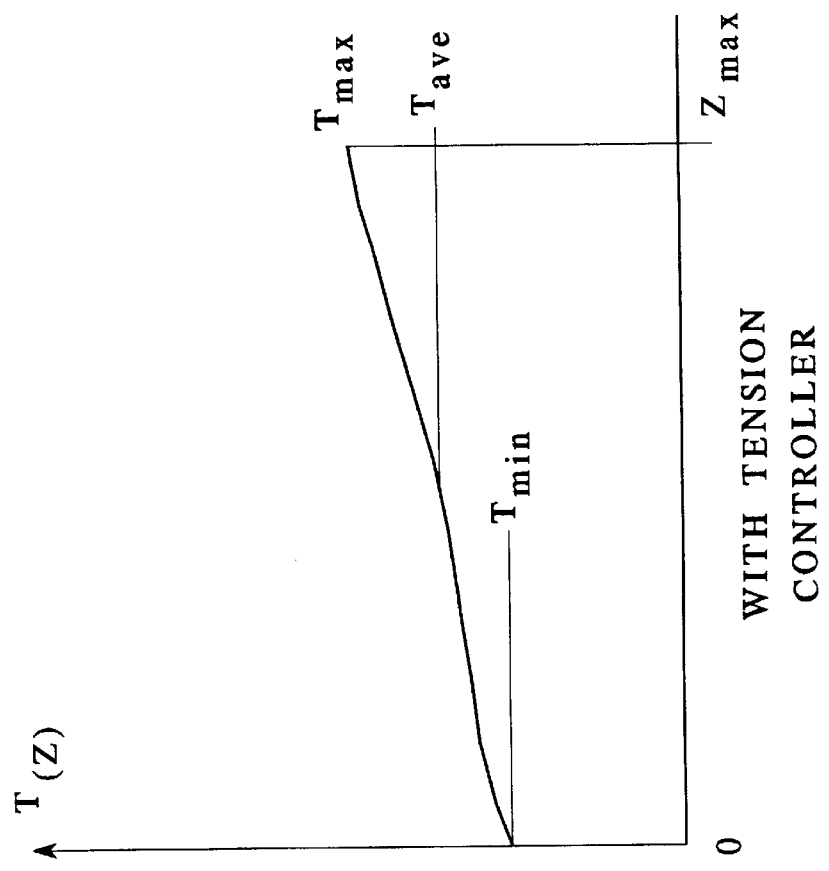
FIG. 2 illustrates a graphical representation of tape transversal tension profile of a prior known tape device.
Figure 3:
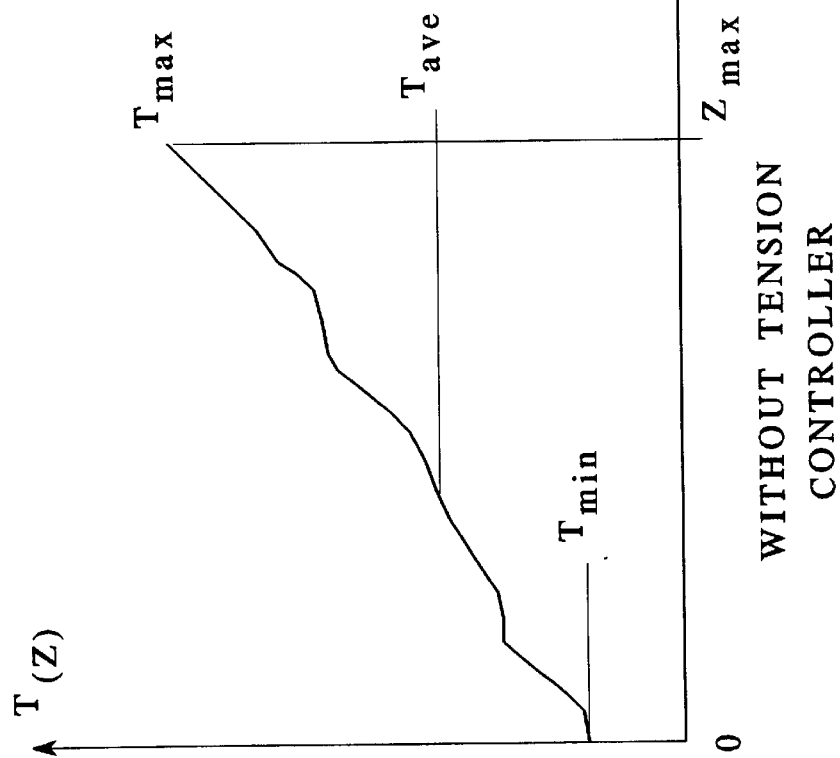
FIG. 3 illustrates a graphical representation of an embodiment of a tape transversal tension profile of the present invention including tension controller.

FIG. 2 illustrates a condition experienced in known tape tensioning devices wherein it is shown that the local tension T(z) along the tape varies from $T_{min}$ at the lower tape edge to $T_{max}$ at the upper edge although these relationships may be reversed depending on the particular tape and the tape slitting. As shown in FIG. 2, the local tape tension T(z) is critical for reading and writing performance. Thus, a higher average tension $T_{ave}$ must be guaranteed to realize a sufficient $T_{min}$. In contrast, as shown in FIG. 3, according to the present invention, the minimum tension $T_{min}$ effectively increases for an equivalent average tension $T_{ave}$ for improved read/write operations, the maximum tension $T_{max}$ is reduced for reduced tape and head wear; therefore, inefficient operation can be prevented.

Figure 4:
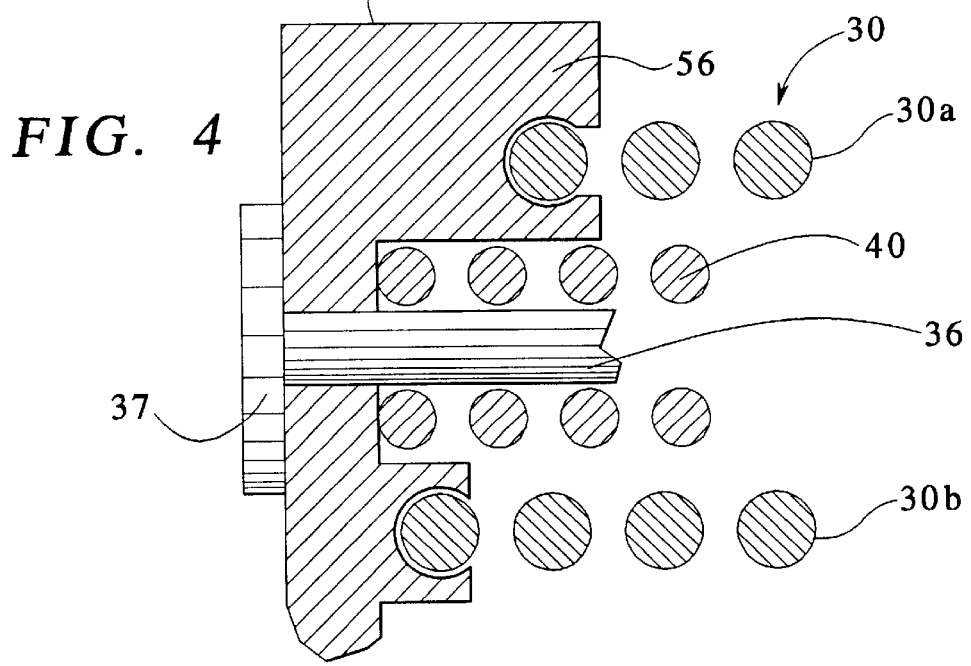
FIG. 4 illustrates a schematic partial enlarged sectional view of an alternate arrangement of the transversal tape tensioning device as shown in FIG. 1.

FIG. 4 illustrates a variation of the structure of a backstop 16' wherein an extending spring clip portion 56 may be fashioned into the backstop 16' to define an asymmetrical reference position for an asymmetrical spring force of the spring 30 on the upper side as opposed to the lower side. That is, the spring 30 is more compressed on a top side 30a thereof toward a vertical bar 18 than at the bottom side 30b thereof. This asymmetry can be used to produce an asymmetrically tensioned tape path, i.e., a tape path with an asymmetrical transverse tape tension. FIG. 4 is shown somewhat exaggerated for demonstrative purposes.

Figure 6:
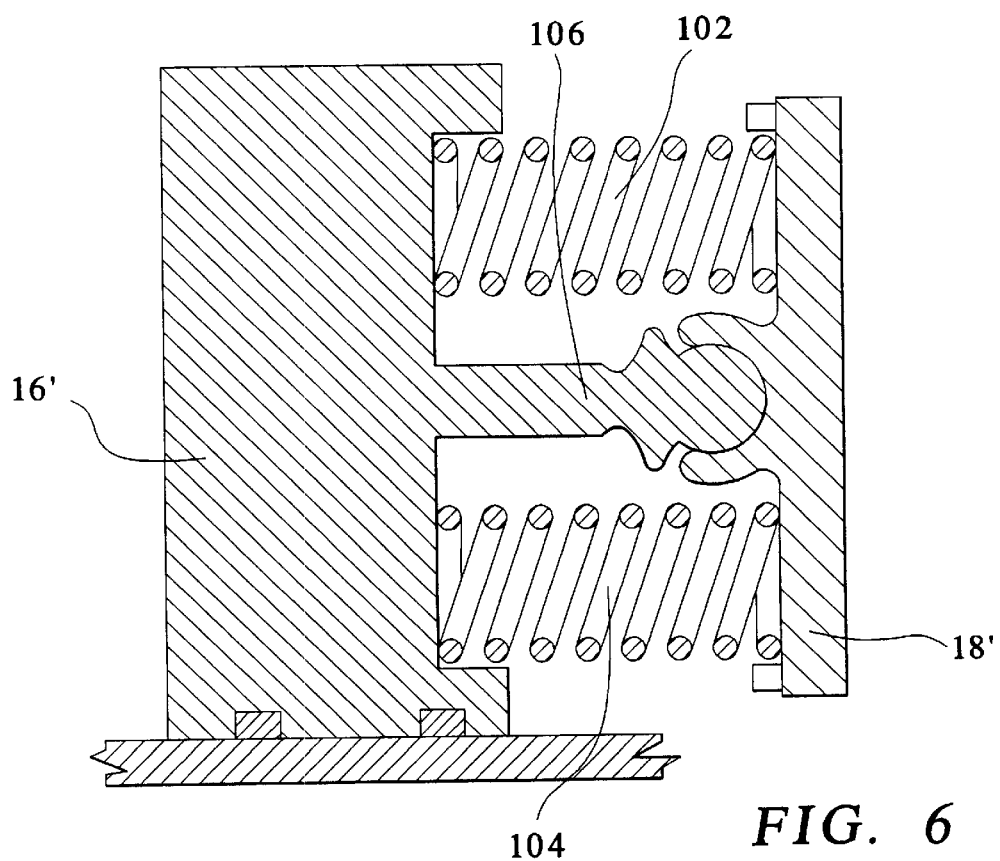
FIG. 6 illustrates a schematic longitudinal sectional view of another embodiment of a transversal tape tensioning device of the present invention.
Figure 7:
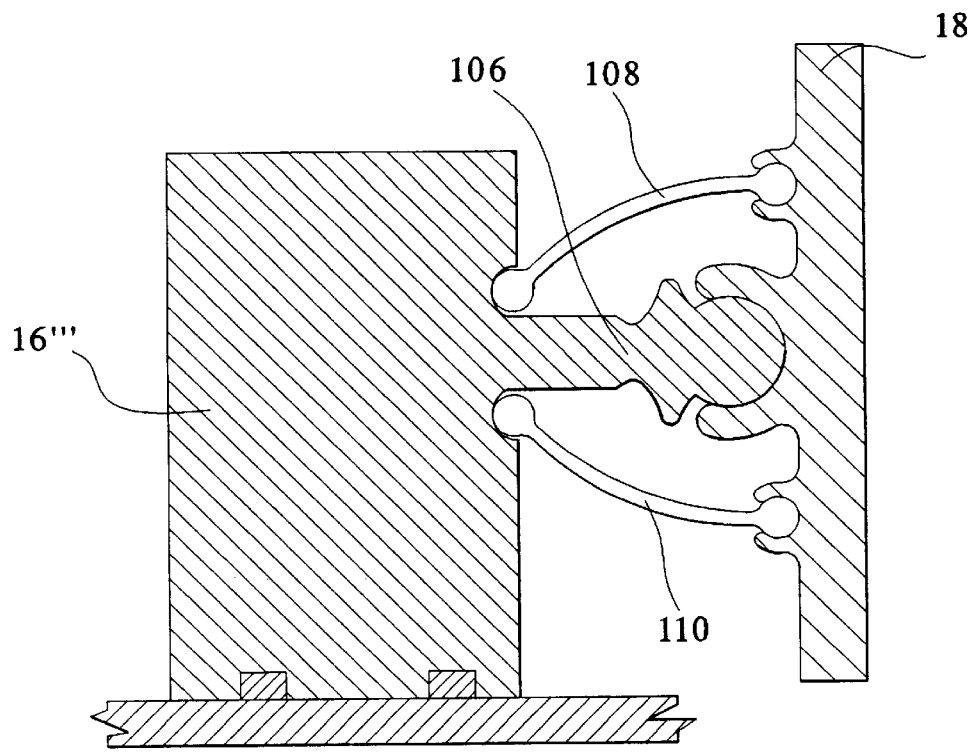
FIG. 7 illustrates a schematic longitudinal sectional view of another embodiment of a transversal tape tensioning device of the present invention.
Figure 8:
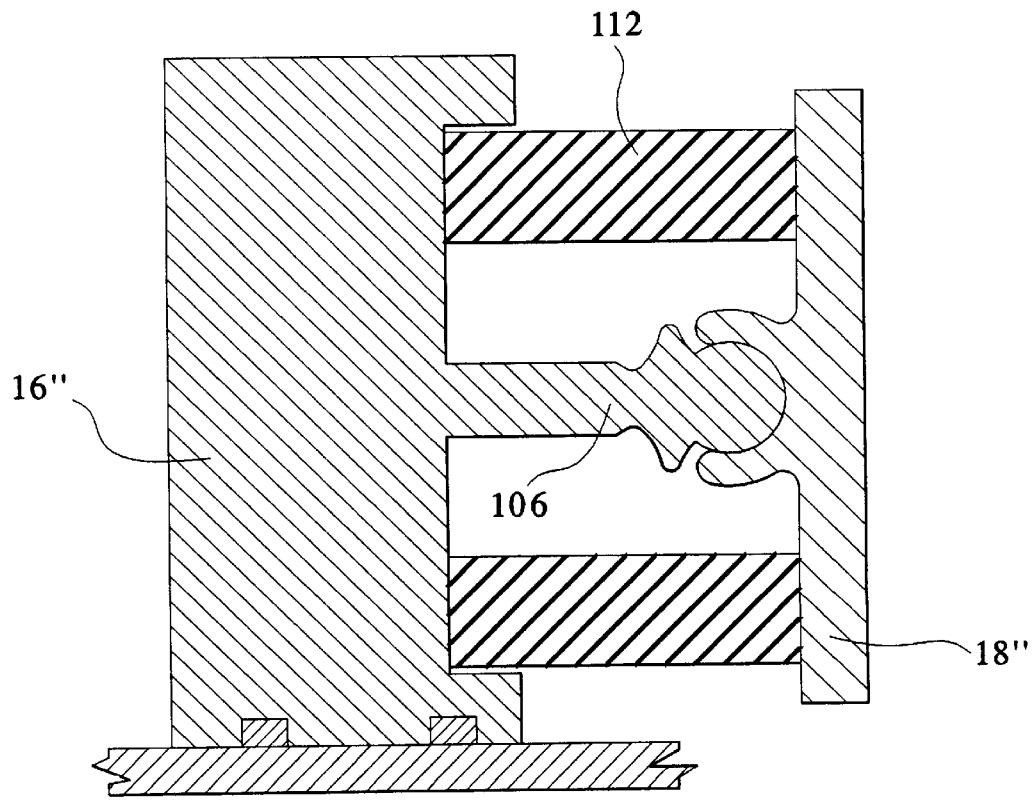
FIG. 8 illustrates a schematic longitudinal sectional view of another embodiment of a transversal tape tensioning device of the present invention.

Alternatively, a separate top spring can be provided which is different from a separate bottom spring in spring constant. An arrangement of a separate top spring 102 and a separate bottom spring 104 is generally illustrated in FIG. 6. That is, the top spring 102 and the bottom spring 104 may be placed on each side of a tension bar 106 rather than a single spring spanning around the tension bar 106. Alternatively, two leaf springs 108,110 may be implemented on each side of the tension bar 106, as generally shown with reference to FIG. 7. Still further, the spring 30, as shown and described with reference to FIG. 1, may be replaced by a cylinder of flexible material 112 as illustrated in FIG. 8.

In each of the embodiments illustrated, backstops 16', 16" and 16'" may require modification as illustrated in order to accommodate the particular tensioning device. Likewise, as illustrated in FIGS. 6 and 8, the tension control bars 18' and 18", respectively, may require modification again to accommodate the particular tensioning device. As shown in FIG. 7, the control bar 18 may be implemented with the leaf spring in a similar fashion as shown and described with reference to FIG. 1.

Figure 9:
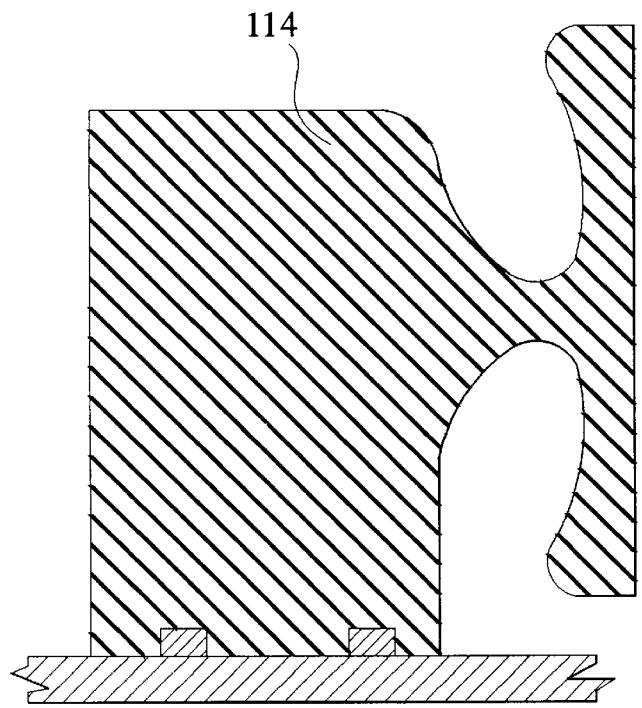
FIG. 9 illustrates a schematic longitudinal sectional view of another embodiment of a transversal tape tensioning device of the present invention.

Yet another embodiment of the Invention is illustrated in FIG. 9 wherein the complete tension controller is molded as a single piece 114 of flexible material. In this instance, the tension bar 106 as shown and described with reference to the other embodiments is completely replaced by the function of the single piece 114 of flexible material.

With respect to the spring 30 and the spring 40 as shown and described with reference to FIGS. 1 and 4, the spring 30 is not absolutely necessary for operation of the tension controller. Due to symmetrical geometry, e.g., the center of the control bar 18 is positioned at the middle of the tape 14. The tension controller works to reduce the tension of the high-tension part of the tape 14 at the same time as the low-tension part of the tape is increased even though no spring force acts against the force of the tape produced by the tape tension. More specifically, when the spring constant of the spring 30 is zero, no spring is installed. But a spring can be used in order to actually reduce the effect of the controller in that the effect of the same is reduced more and more as the spring constant is increased. For instance, if the tension in the upper part of the tape 14 is higher than the lower part of the tape 14, the upper part of the tension bar is pushed in. If no spring or the spring constant is zero, then, in principle, all of the force from the high-tension part acts on the lower part and pushes the tape 14 outwards until an equilibrium is obtained. The equilibrium is characterized by equal tape tension in the upper and lower part of the tape 14 unless the difference in tension is so large that the tension bar 18 reaches its end points for the movement before equilibrium is reached.

If a spring is provided with a given spring force, some of the force from the high-tension part of the tape 14 is used to overcome the spring force and not to push the lower part of the tension bar outwards. The higher the spring constant, the less effect of the tension controller.

With respect to the spring 40, a spring in the position of the spring 40 works to smooth or reduce the variation in total tension, i.e., the sum of the tension in the upper part and the lower part of the tape 14 or the integral of the tension along the profile of the tape 14, of the tape path. The higher the spring constant, the less the "smoothening" effect on the tension variation. As the spring constant of the spring 40 approaches infinity, corresponding to a case where the bar 36 is completely fixed to the support 16, the effect of the controller on the total tension goes to zero, i.e., has no effect. This particular arrangement may also be implemented as an optional embodiment shown and described with reference to FIGS. 6–9. As a result, a very simple embodiment may be implemented wherein no control of the total tension is required or wherein the total tension may be controlled by other means.

Figure 10:
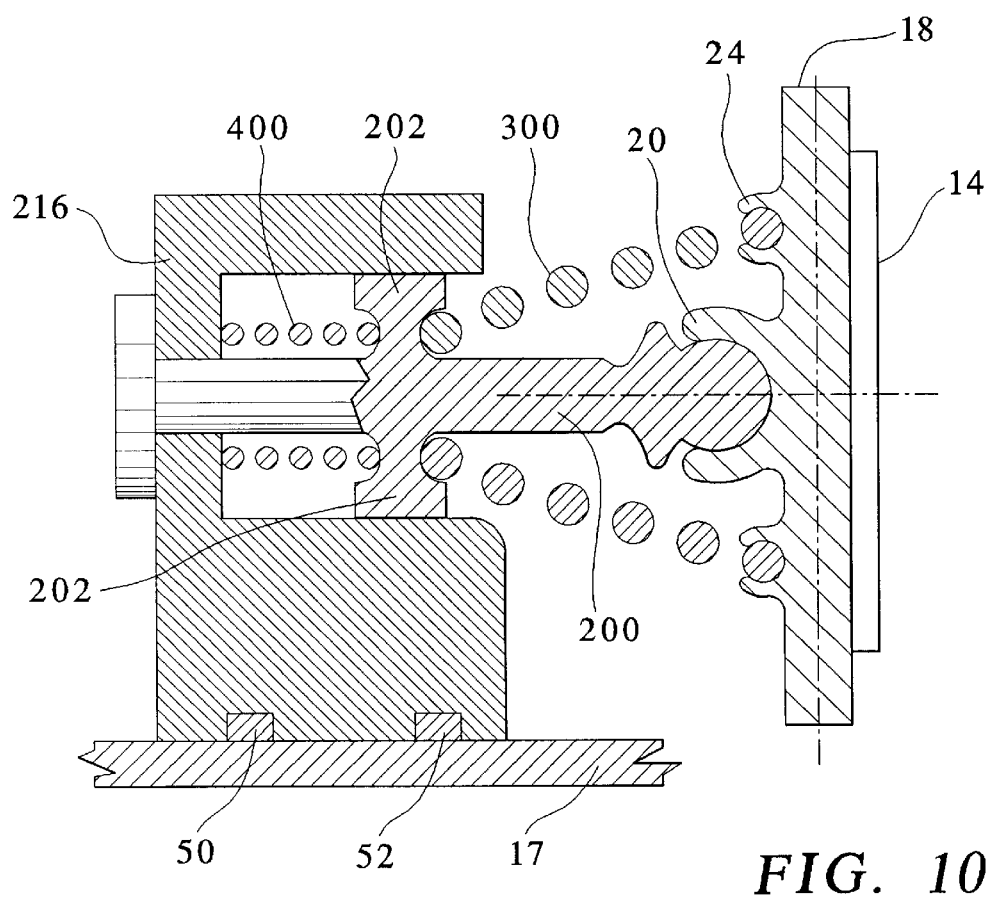
FIG. 10 illustrates a schematic longitudinal sectional view of a preferred embodiment of a transversal tape tensioning device of the present invention.

Yet another embodiment of the present invention is illustrated in FIG. 10. In this embodiment, the spring 300 may be fixed between the control bar 18 and a pin 200 as illustrated. A second spring 400 is then incorporated as shown between the pin 200 and a backstop 216. In FIG. 10, like numerals refer to like parts as shown and described with reference to FIG. 1. The pin 200 is designed such that both springs 300 and 400 operate in association with a shoulder 202 of the pin 200 in a similar manner as that described with reference to FIG. 1 to maintain proper tension on the tape 14 by the control bar 18.

FIG. 5 schematically illustrates the tensioning device 10 located in a tape drive 60 having a magnetic head 64 for read/write operation on the tape 14. A cartridge 70 having reels 72,74 is loaded in the tape drive 60, and the tape 14 is extracted. Suitable pins, guides or rollers 78,80,82 are arranged to guide the tape 14 between the reels 72,74 and across a front 86 of the head 64.

The tensioning device 10 exerts a force through the bar 18 to adjust transverse tension in the tape 14 as described above. Although the device 10 is illustrated in a tape extract type tape drive, the device can be incorporated into a non-extract tape drive also. The device 10 can also be incorporated into the cartridge, itself, rather than into the tape drive. In addition, the tension control bar 18 may be positioned in many possible ways, either on the front side or the back side of the magnetic surface of the tape 14.

It should be understood that various changes and modifications to the presently preferred embodiments described herein will be apparent to those skilled in the art. Such changes and modifications may be made without departing from the spirit and scope of the present invention and without diminishing its attendant advantages. It is, therefore, intended that such changes and modifications be covered by the appended claims.

I claim:

1. A system for compensating tension variations across a transverse cross-section of a magnetic tape, comprising:

a magnetic tape under tension sliding across a magnetic head for reading and writing operation;

a control bar having a control surface for pressing against a span of said magnetic tape sliding across the control surface, said bar being held by a single mounting element only;

a back stop mounted to be stationary with respect to said magnetic tape, said mounting element being connected to said back stop so as to prevent movement of said mounting element in a direction corresponding to a running direction of the tape defined at a point where a longitudinal axis of said mounting element intersects with the control surface, and also to prevent movement of said mounting element in a direction which is both perpendicular to said running direction and perpendicular to said mounting element longitudinal axis; and said mounting element comprising at one end a cylindrical joint element received in a corresponding cylindrical socket connected to the control bar, a longitudinal axis of said cylindrical joint element being parallel to said running direction of the tape.

2. The system according to claim 1 wherein a first tensioning device is positioned between said back stop and said control bar to bias said control bar against said magnetic tape and wherein said mounting element is slidably attached to said back stop permitting slidable motion of said mounting element relative to said back stop in a direction along said longitudinal axis of said mounting element.

3. The system according to claim 2 wherein the mounting element comprises a pin having an end opposite said one end passing through an aperture in said back stop and having at said opposite end a head portion, the pin having an intermediate shoulder, and a second tensioning device positioned between the shoulder and the back stop.

4. The system according to claim 1 wherein a first tensioning device comprising two springs is arranged between the control bar and the back stop.

5. The system according to claim 1 wherein a first tensioning device comprising a cylinder of flexible material is arranged between the control bar and the back stop.

6. The system according to claim 1 wherein a first tensioning device is integrally formed with and provided between the back stop and the control bar.

7. The system according to claim 1 wherein a first tensioning device is fixed to the back stop and provided between the back stop and the control bar.

8. The system according to claim 1 wherein the control bar has a curved surface curving in the running direction of the tape, and a straight surface perpendicular to the running direction of the tape.

9. A method for compensating tension variations across a transverse cross-section of a magnetic tape, comprising the steps of:

sliding the magnetic tape across a magnetic head for reading and writing operations;

providing a control bar held by only a single mounting element and having a longitudinal axis, one end of the mounting element connecting to the control bar by a cylindrical joint element received in a corresponding cylindrical socket connected to the control bar, and positioning the magnetic tape to slide across a control surface of the control bar for pressing against a span of said magnetic tape, said cylindrical joint element having a longitudinal axis parallel to a direction corresponding to a running direction of said magnetic tape defined at a point where said longitudinal axis of said mounting element intersects with the control surface; and providing a fixed back stop connected to said mounting element, and connecting said mounting element to said fixed back stop so that the mounting element does not move in a direction corresponding to said running direction of the magnetic tape, and does not move in a direction which is both perpendicular to said running direction of the magnetic tape and perpendicular to said mounting element longitudinal axis.

10. The method according to claim 9 including the step of permitting the mounting element to move relative to said fixed back stop in a direction along said longitudinal axis of said mounting element.

11. The method according to claim 9 including the step of resiliently biasing the control bar towards said magnetic tape by a tensioning device positioned between said control bar and said back stop.

12. The method according to claim 11 including the step of providing an additional tensioning device between a shoulder on the mounting element and the backstop to resiliently bias the mounting element towards said magnetic tape.

13. The method according to claim 9 including the step of providing said mounting element to be slidably received by said back stop for sliding motion of the mounting element in a direction along said longitudinal axis of said mounting element.

* * * * *